United States Patent
Bang et al.

(10) Patent No.: US 10,175,667 B2
(45) Date of Patent: Jan. 8, 2019

(54) STORAGE DEVICES INCLUDING DYNAMIC INTERNAL THERMAL THROTTLING

(71) Applicant: Samsung Electronics Co., Ltd., Suwon-si, Gyeonggi-do (KR)

(72) Inventors: Kwangkyu Bang, Hwaseong-si (KR); Heeyoub Kang, Seoul (KR); HyoJae Bang, Hwaseong-si (KR); Kitaek Lee, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 233 days.

(21) Appl. No.: 15/098,427

(22) Filed: Apr. 14, 2016

(65) Prior Publication Data

US 2017/0052551 A1    Feb. 23, 2017

(30) Foreign Application Priority Data

Aug. 17, 2015    (KR) .................. 10-2015-0115524

(51) Int. Cl.
| | |
|---|---|
| *G05D 23/00* | (2006.01) |
| *G05B 15/02* | (2006.01) |
| *G06F 3/06* | (2006.01) |
| *G06F 1/20* | (2006.01) |

(52) U.S. Cl.
CPC ............ *G05B 15/02* (2013.01); *G06F 1/206* (2013.01); *G06F 3/0616* (2013.01); *G06F 3/0659* (2013.01); *G06F 3/0673* (2013.01)

(58) Field of Classification Search
CPC ...................................................... G06F 1/206
USPC ....................................................... 700/299
See application file for complete search history.

(56) References Cited

U.S. PATENT DOCUMENTS

| | | | | |
|---|---|---|---|---|
| 6,373,768 B2* | 4/2002 | Woo | ............... | G06F 1/206 365/211 |
| 6,564,288 B2* | 5/2003 | Olarig | ............... | G06F 1/206 365/211 |
| 6,886,120 B2* | 4/2005 | Yamazaki | ............... | G11C 29/028 369/53.1 |
| 7,318,130 B2 | 1/2008 | Morrow et al. | | |
| 7,451,053 B2 | 11/2008 | Jeong | | |
| 7,590,473 B2 | 9/2009 | Wyatt | | |
| 7,679,133 B2 | 3/2010 | Son et al. | | |
| 7,948,793 B2* | 5/2011 | Porter | ............... | G11C 7/04 365/148 |
| 8,122,265 B2 | 2/2012 | Radhakrishnan et al. | | |
| 8,174,921 B2 | 5/2012 | Kim et al. | | |
| 8,238,185 B2 | 8/2012 | Lee et al. | | |
| 8,531,235 B1* | 9/2013 | Zonte | ............... | G05F 3/30 327/512 |
| 8,553,466 B2 | 10/2013 | Han et al. | | |
| 8,559,235 B2 | 10/2013 | Yoon et al. | | |
| 8,654,587 B2 | 2/2014 | Yoon et al. | | |

(Continued)

FOREIGN PATENT DOCUMENTS

| | | |
|---|---|---|
| KR | 1020070019066 | 2/2007 |
| KR | 1020150120213 | 10/2015 |

*Primary Examiner* — Suresh Suryawanshi
(74) *Attorney, Agent, or Firm* — Myers Bigel P.A.

(57) ABSTRACT

A storage device may include a nonvolatile memory including a plurality of memory blocks and a memory controller configured to determine a comparison between an idle current value of the nonvolatile memory and a reference current value and to adjust, based on the comparison, a start temperature at which the storage device begins operating speed control of the storage device.

20 Claims, 12 Drawing Sheets

(56) References Cited

U.S. PATENT DOCUMENTS

| | | |
|---|---|---|
| 8,694,719 B2 | 4/2014 | Lassa et al. |
| 9,880,781 B2 * | 1/2018 | Oh ........................ G06F 3/0653 |
| 2011/0233648 A1 | 9/2011 | Seol et al. |
| 2014/0032949 A1 | 1/2014 | Kim et al. |
| 2014/0325122 A1 | 10/2014 | Kim et al. |
| 2015/0301744 A1 * | 10/2015 | Kim ...................... G06F 3/0679 |
| | | 711/103 |

* cited by examiner

FIG. 8

| Mode | Reference Current | REF_DTT Condition |
|------|-------------------|-------------------|
| M1 | REF_I1 | T1≤T<T2 |
| M2 | REF_I2 | T2≤T<T3 |
| M3 | REF_I3 | T3≤T |

↓

| Mode | Reference Current | Real_DTT Condition |
|------|-------------------|--------------------|
| M1 | Idle_I1(> REF_I1) | T1+Δt1≤T<T2+Δt2 |
| M2 | Idle_I2(> REF_I2) | T2+Δt2≤T<T3+Δt3 |
| M3 | Idle_I3(> REF_I3) | T3+Δt3≤T |

STORAGE DEVICES INCLUDING DYNAMIC INTERNAL THERMAL THROTTLING

CROSS-REFERENCE TO RELATED APPLICATIONS

The present application claims priority under 35 USC § 119 to Korean Patent Application No. 10-2015-0115524, filed on Aug. 17, 2015, in the Korean Intellectual Property Office, the disclosure of which is hereby incorporated herein by reference in its entirety.

FIELD

Embodiments of the inventive concepts relate to storage devices and, in particular, storage devices including temperature management.

BACKGROUND

Storage devices may store data according to the control of a host device such as a computer, a smartphone, and a smart pad. Storage devices may include a device that stores data on a magnetic disk such as a hard disk drive (HDD) and/or a device that stores data in a semiconductor memory (e.g., a nonvolatile memory such as a solid state drive (SSD) or a memory card).

Nonvolatile memory devices include, for example, a read-only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and/or the like.

When a storage device including a nonvolatile memory device repeatedly performs data read and write operations for a long period of time, a malfunction may be caused by PCB heating. Accordingly, the storage device may need to be protected through performance adjustment of the storage device to prevent the malfunction.

SUMMARY

According to some embodiments of the inventive concepts, storage devices are provided. A storage device may include a nonvolatile memory including a plurality of memory blocks and a memory controller configured to determine a comparison between an idle current value of the nonvolatile memory and a reference current value and to adjust, based on the comparison, a start temperature at which the storage device begins operating speed control of the storage device.

In some embodiments, the memory controller may increase the start temperature from a basic value when the idle current value is greater than the reference current value.

In some embodiments, the memory controller may decrease the start temperature from a basic value when the idle current value is smaller than the reference current value.

In some embodiments, the memory controller may receive a command that includes the idle current value from an external test device and may store the received idle current value in at least one of the memory blocks.

In some embodiments, the at least one memory block of the plurality of memory blocks may be within a security area in which bad area information of the nonvolatile memory and the idle current value of the nonvolatile memory are stored.

In some embodiments, the storage device may include a temperature sensor that is configured to detect a temperature and to output information of a detected temperature value to the memory controller.

In some embodiments, the storage device may be configured to operate in a first mode in which the storage device operates at first speed that is lower than normal speed when the detected temperature value is equal to or greater than a first start temperature and the detected temperature is included in a first temperature range that is lower than a second start temperature. The storage device may be configured to operate in a second mode in which the storage device operates at second speed that is lower than the first speed when the detected temperature value is equal to or greater than the second start temperature and the detected temperature is included in a second temperature range that is lower than a third start temperature. The storage device may be configured to operate in a third mode in which the storage device operates at third speed that is lower than the second speed when the detected temperature value is included in a third temperature range that is greater than the third start temperature.

In some embodiments, the memory controller may include a first reference current value that corresponds to the first temperature range, a second reference current value that corresponds to the second temperature range, and a third reference current value that corresponds to the third temperature range.

In some embodiments, the memory controller may increase a first start temperature from a first basic value when a first idle current value of the storage device that corresponds to the first temperature range is greater than the first reference current value. The memory controller may increase a second start temperature from a second basic value when a second idle current value of the storage device that corresponds to the second temperature range is greater than the second reference current value. The memory controller may increase a third start temperature from a third basic value when a third idle current value of the storage device that corresponds to the third temperature range is greater than the third reference current value.

In some embodiments, the memory controller may decrease a first start temperature from a first basic value when a first idle current value of the storage device that corresponds to the first temperature range is less than the first reference current value. The memory controller may decrease a second start temperature from a second basic value when a second idle current value of the storage device that corresponds to the second temperature range is less than the second reference current value. The memory controller may decrease a third start temperature from a third basic value when a third idle current value of the storage device that corresponds to the third temperature range is less than the third reference current value.

In some embodiments, the idle current value may be stored in at least one of the memory blocks of the plurality of memory blocks or in a read only memory.

According to some embodiments of the inventive concepts, operating methods of a storage device including a temperature sensor, a nonvolatile memory including a plurality of memory blocks, and a memory controller connected to the temperature sensor and the nonvolatile memory may be provided. In some example embodiments, an operating method may include reading an idle current value of the storage device from at least one of the memory blocks by the memory controller and comparing the idle current value with a reference current value to set start temperature at which operating speed control of the storage device start by the memory controller.

According to some embodiments of the inventive concepts, storage devices may be provided. In some example embodiments, a storage device may include a nonvolatile memory including a plurality of memory blocks, a temperature sensor configured to detect a detected temperature, and a memory controller configured to determine a comparison between an idle current value of the storage device and a reference current value and to adjust, based on the comparison, a start temperature at which the storage device begins operating speed control of the storage device. The memory controller may be configured to operate at an operating speed lower than an operating speed of a normal operation when the detected temperature obtained from the temperature sensor is higher than or equal to the start temperature.

In some embodiments, the nonvolatile memory may include cell strings arranged on a substrate. Ones of the cell strings may include at least one selection transistor and memory cells stacked on the substrate in a direction perpendicular to the substrate.

In some embodiments, ones of the at least one selection transistor and the memory cells may be charge-trap-type transistors.

In some embodiments, the memory controller may receive the idle current value via a command. The command may be a combination of one or more normal commands or a vendor unit command.

According to some embodiments of the inventive concepts, storage devices may be provided. In some embodiments, a storage device may include a nonvolatile memory and a memory controller that is coupled to the nonvolatile memory. The memory controller may be configured to determine an idle current value of the storage device corresponding to a current flowing to the storage device when the storage device performs no operation. The memory controller may be configured to determine a comparison between the idle current value of the storage device and a reference current value. The memory controller may be configured to adjust a start temperature based on the comparison between the idle current value of the storage device and the reference current value. The memory controller may be configured to determine a comparison between a present temperature of the storage device and the start temperature. The memory controller may be configured to regulate a speed of the storage device based on the comparison between the present temperature of the storage device and the start temperature.

In some embodiments, the memory controller may be configured to adjust the start temperature by increasing the start temperature when the idle current value is greater than the reference current value. The memory controller may be configured to regulate the speed of the storage device by operating the storage device at a first speed when the present temperature of the storage device is less than the start temperature and operating the storage device at a second speed that is less than the first speed when the present temperature of the storage device is greater than the start temperature.

In some embodiments, the memory controller may be configured to adjust the start temperature by decreasing the start temperature when the idle current value is less than the reference current value. The memory controller may be configured to regulate the speed of the storage device by operating the storage device at a first speed when the present temperature of the storage device is less than the start temperature and operating the storage device at a second speed that is less than the first speed when the present temperature of the storage device is greater than the start temperature.

In some embodiments, the start temperature may include a first start temperature, a second start temperature that is greater than the first temperature, and a third start temperature that is greater than the second temperature. The reference current value may include a first reference current value, a second reference current value, and a third reference current value. The memory controller may be configured to adjust the start temperature by increasing the first start temperature when the idle current value is greater than the first reference current value, increasing the second start temperature when the idle current value is greater than the second reference current value, and increasing the third start temperature when the idle current value is greater than the third reference current value. The memory controller may be configured to regulate the speed of the storage device by operating the storage device at a first speed when the present temperature of the storage device is less than the first start temperature, operating the storage device at a second speed that is less than the first speed when the present temperature of the storage device is greater than the first start temperature and less than the second start temperature, operating the storage device at a third speed that is less than the second speed when the present temperature of the storage device is greater than the second start temperature and less than the third start temperature, and operating the storage device at a fourth speed that is less than the third speed when the present temperature of the storage device is greater than the third start temperature.

In some embodiments, the start temperature may include a first start temperature, a second start temperature, and a third start temperature. The reference current value may include a first reference current value, a second reference current value, and a third reference current value. The memory controller may be configured to adjust the start temperature by decreasing the first start temperature when the idle current value is less than the first reference current value, decreasing the second start temperature when the idle current value is less than the second reference current value, and decreasing the third start temperature when the idle current value is less than the third reference current value. The memory controller may be configured to regulate the speed of the storage device by operating the storage device at a first speed when the present temperature of the storage device is less than the first start temperature, operating the storage device at a second speed that is less than the first speed when the present temperature of the storage device is greater than the first start temperature and less than the second start temperature, operating the storage device at a third speed that is less than the second speed when the present temperature of the storage device is greater than the second start temperature and less than the third start temperature, and operating the storage device at a fourth speed that is less than the third speed when the present temperature of the storage device is greater than the third start temperature.

It is noted that aspects of the inventive concepts described with respect to one embodiment, may be incorporated in a different embodiment although not specifically described relative thereto. That is, all embodiments and/or features of any embodiment can be combined in any way and/or combination. These and other objects and/or aspects of the present inventive concepts are explained in detail in the specification set forth below.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain principles of the disclosure. In the drawings:

FIG. 8 is a block diagram illustrating a temperature table according to some embodiments of the inventive concepts of inventive concepts;

DETAILED DESCRIPTION

Figure 1:
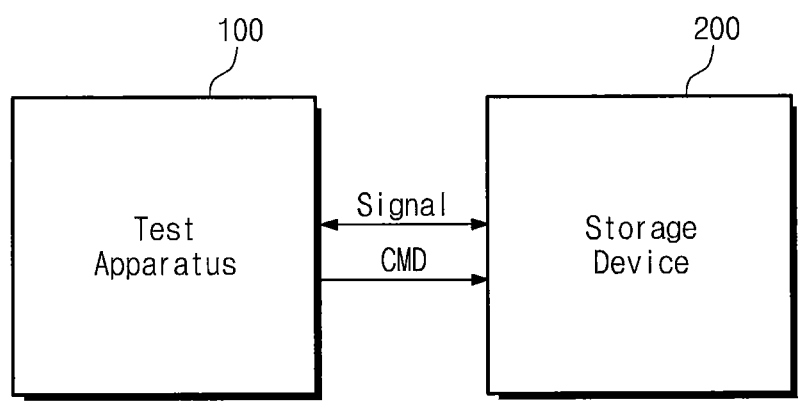
FIG. 1 is a block diagram schematically illustrating a test apparatus and a storage device according to some embodiments of the inventive concepts.

Example embodiments will be described in detail with reference to the accompanying drawings. Inventive concepts, however, may be embodied in various different forms, and should not be construed as being limited only to the illustrated embodiments. Rather, example embodiments are provided as examples so that this disclosure will be thorough and complete, and will fully convey the concept of inventive concepts to those skilled in the art. Accordingly, known processes, elements, and techniques might not be described with respect to some of the example embodiments of inventive concepts. Like reference numerals may denote like elements throughout the attached drawings and written description.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram schematically illustrating a test apparatus and a storage device according to some embodiments of the inventive concepts. Referring to FIG. 1, a test apparatus 100 and a storage device 200 may perform communication. The test apparatus 100 may be an automated test equipment (ATE) to test the storage device 200.

The test apparatus 100 may measure an idle current value of the storage device 200 according to an external temperature. Idle current may refer to current flowing to the storage device 200 when the storage device 200 performs no operation because there is no operation required from an external device to the storage device 200. The test apparatus 100 may obtain the idle current value of the storage device 200 at a start temperature, or threshold, at which the storage device 200 may begin operating speed control of the storage device 200. In some embodiments, the operating speed control of the storage device 200 may be done in a plurality of modes. For example, when operation control of the storage device 200 is done in one of a first mode, a second mode, and a third mode, the test apparatus 100 may obtain an idle current value of the storage device 200 at boundary temperatures of the temperature range of each mode.

The test apparatus 100 may output a signal for testing the storage device 200 to the storage device 200 and receive a test result from the storage device 200. Specifically, the test result received by the test apparatus 100 may include at least one idle current value of the storage device 200. The test apparatus 100 may output the idle current value received from the storage device 200 to the storage device 200 through a command CMD. The command CMD may be a vendor unit command (VUC) or a combination of normal commands for accessing a nonvolatile memory. This will be described in further detail later.

Figure 2:
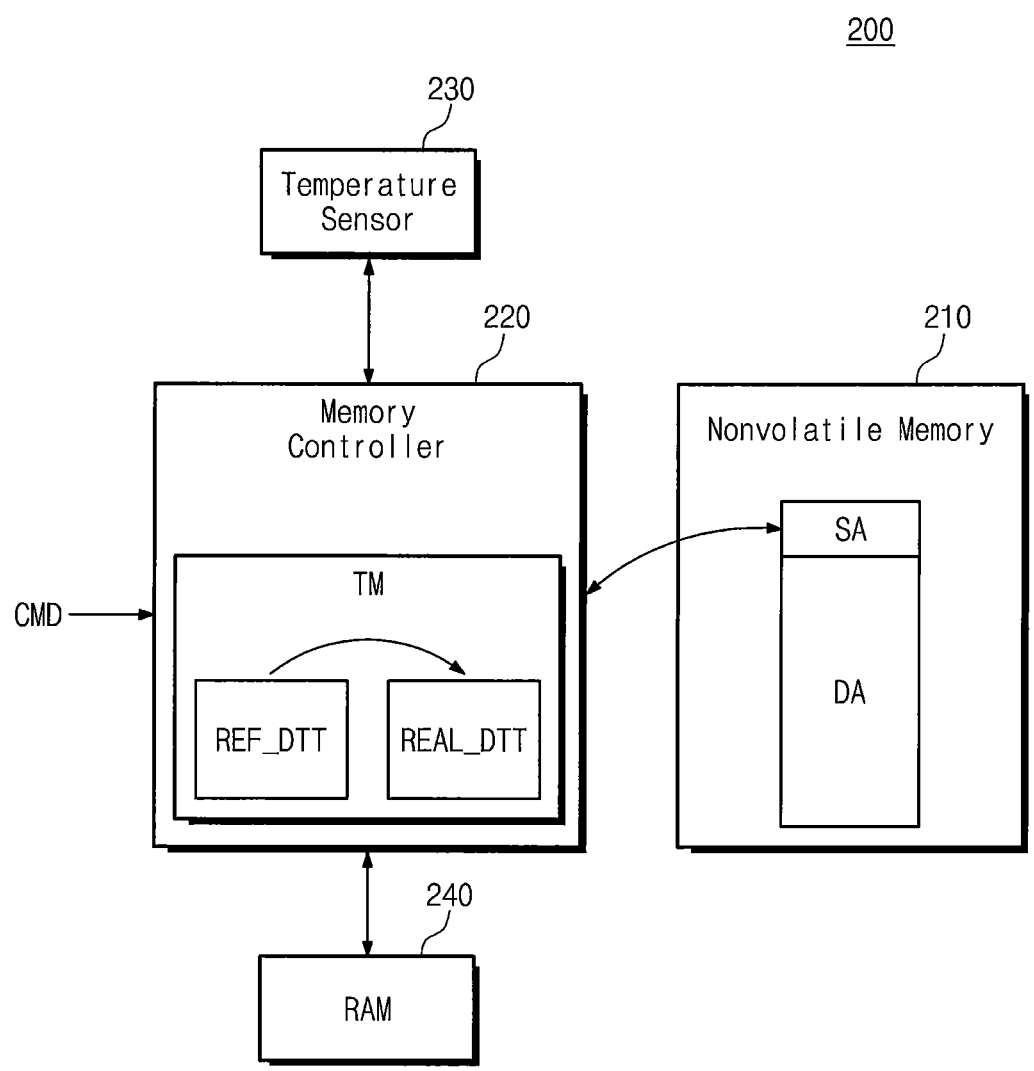
FIG. 2 is a block diagram schematically illustrating a storage device according to some embodiments of the inventive concepts.

FIG. 2 is a block diagram schematically illustrating a storage device according to some embodiments of the inventive concepts. Referring to FIGS. 1 and 2, a storage device 200 may include a nonvolatile memory 210, a memory controller 220, a temperature controller 220, a temperature sensor 230, and a random access memory (RAM) 240.

The nonvolatile memory device 210 may include a security area SA and a data area DA. In some embodiments, the secure area SA may include information on a bad area of the nonvolatile memory 210. The bad area may refer to an area determined to have low reliability, and memory cells included in the bad area may not used. In addition, the security area SA may include the idle current value of the storage device 200. The idle current value may be received from the test apparatus 100 through the command CMD. Example embodiments are not limited thereto, and the idle current value may be stored in a read only memory (ROM) of the nonvolatile memory 210.

The memory controller 220 may receive the command CMD including the idle current value of the storage device 200 from the test apparatus 100. The memory controller 220 may store an idle information value in the security area SA, the ROM, or a firmware code of the nonvolatile memory 210. Then, when the storage device 200 is connected to a host device, the memory controller 220 may read the idle current value from the nonvolatile memory 210.

The memory controller 220 may include a temperature manager TM. The temperature manager TM may control the storage device 200 based on idle current information and a temperature sensed by the temperature sensor 230. A reference temperature control table REF_DTT may include information of the start temperature of the operating speed control of the nonvolatile memory 210 according to reference current.

The temperature manager TM may include a real temperature control table REAL_DTT reflecting the idle current value of the storage device 200. The real temperature control table REAL_DTT may include information of the controlled start temperature of the operating speed control that is obtained by comparing a reference current value with the idle current value. The memory controller 220 may perform the operating speed control using the real temperature control table REAL_DTT of the temperature manager TM.

The temperature sensor 230 may detect a temperature and output temperature information indicating the detected temperature. For example, the temperature sensor 230 may store the temperature information in the RAM 240. Accordingly, the memory controller 220 or the temperature manager TM may obtain the temperature information from the temperature sensor 230 or the temperature information stored in the RAM 240. The temperature sensor 230 may be inside the nonvolatile memory 210, the memory controller 220 or the RAM 240.

Figure 3:
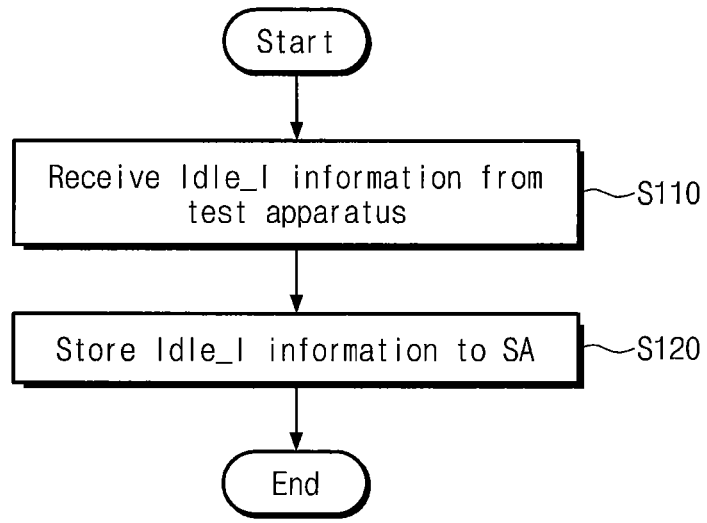
FIG. 3 is a flowchart illustrating a method for storing idle current information during test of a storage device according to some embodiments of the inventive concepts.

FIG. 3 is a flowchart illustrating a method for storing idle current information during test of a storage device according to some embodiments of the inventive concepts. Referring to FIGS. 1 to 3, the memory controller 220 may receive an idle current value Idle_I from the test apparatus 100 (S110). Specifically, the memory controller 220 may receive a command CMD including the idle current value Idle_I of the storage device 200 from the test apparatus 100 during the test of the storage device 200.

The memory controller 220 may store the idle current value Idle_I received from the test apparatus 100 in the security area SA of the nonvolatile memory 210 (S120).

Figure 4:
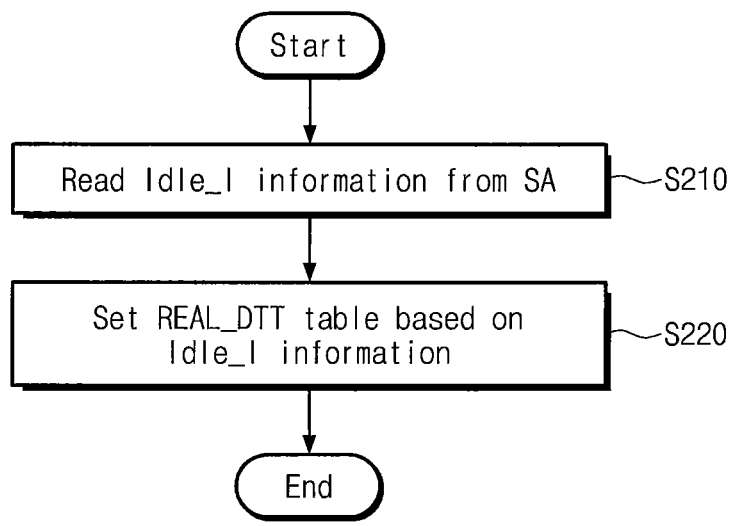
FIG. 4 is a flowchart illustrating an operation method of a memory controller according to some embodiments of the inventive concepts.

FIG. 4 is a flowchart illustrating an operation method of a memory controller according to some embodiments of the inventive concepts. Referring to FIGS. 2 and 4, the memory controller 220 may read the idle current value Idle_I from the security area SA of the nonvolatile memory 210 (S210). The memory controller 220 may set the real temperature control table REAL_DTT based on the idle current value Idle_I (S220). In some embodiments, the memory controller 220 may set the real temperature control table REAL_DTT to an area of the temperature manager TM. Setting the real temperature control table REAL_DTT of the memory controller 220 will be described in detail later with reference to FIGS. 6 to 9.

Figure 5:
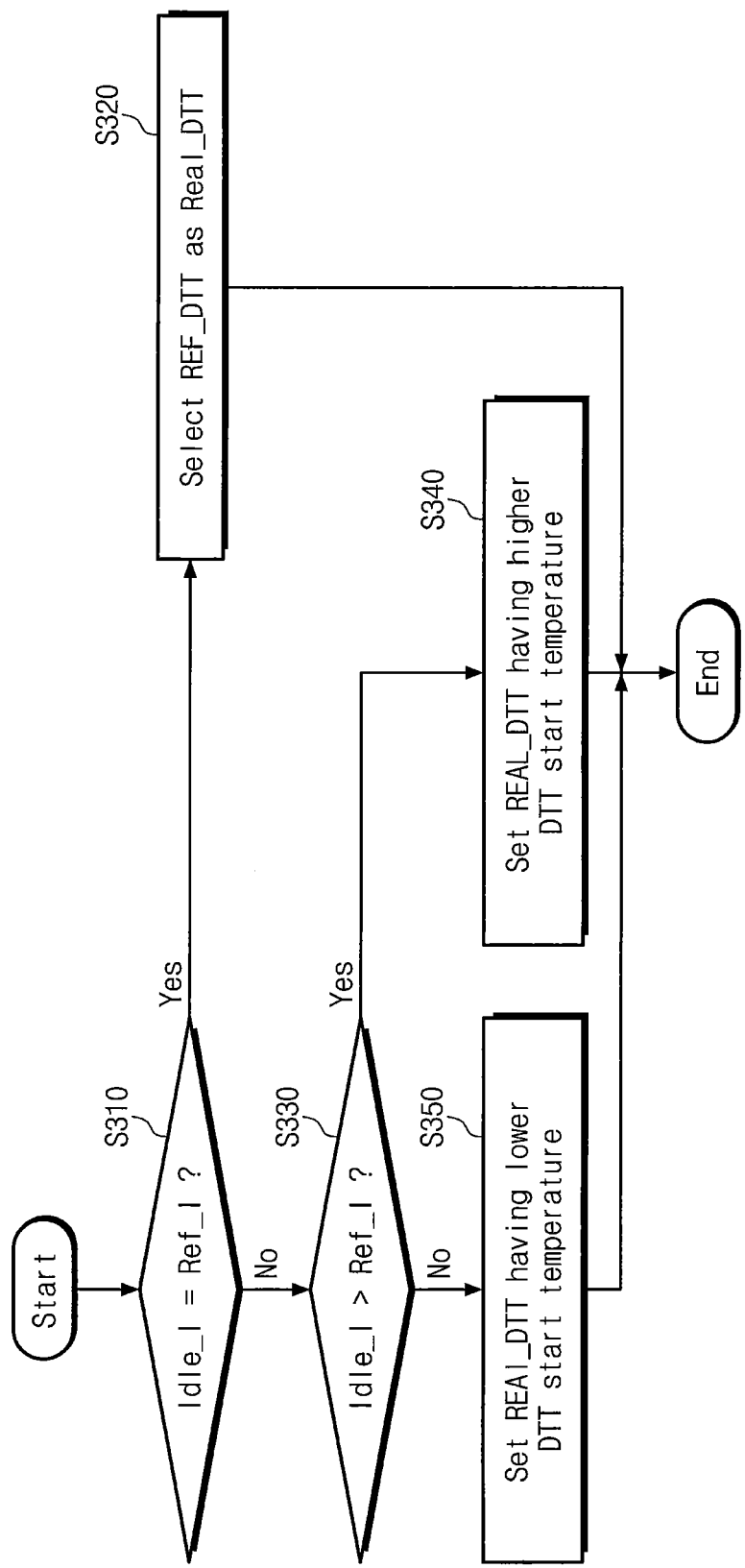
FIG. 5 is a flowchart illustrating a method for controlling operation of a storage device by a memory controller according to some embodiments of the inventive concepts.

FIG. 5 is a flowchart illustrating a method for controlling operation of a storage device by a memory controller according to some embodiments of the inventive concepts. Referring to FIGS. 2 and 5, the memory controller 220 may determine whether a previously stored reference current value REF_I and the idle current value Idle_I of the storage device 200 are equal to each other (S310). When the previously stored reference current value REF_I and the idle current value Idle_I of the storage device 200 are equal to each other, the memory controller 220 may perform temperature control of the storage device 200 using the reference temperature control table REF_DTT (S320).

When the previously stored reference current value REF_I, and the idle current value Idle_I of the storage device 200 are not equal to each other, the memory controller 220 may determine whether the previously stored reference current value REF_I is greater than the idle current value Idle_I of the storage device 200 (S330). When the previously stored reference current value REF_I is smaller than the idle current value Idle_I of the storage device 200, the memory controller 220 may set the real temperature control table REAL_DTT to have a start temperature that is higher than the reference temperature included in the reference temperature control table REF_DTT (S340).

When the previously stored reference current value REF_I is greater than the idle current value Idle_I of the storage device 200, the memory controller 220 may set the real temperature control table REAL_DTT to have a start temperature that is lower than the reference temperature included in the reference table control table REF_DTT (S350).

Figure 6:
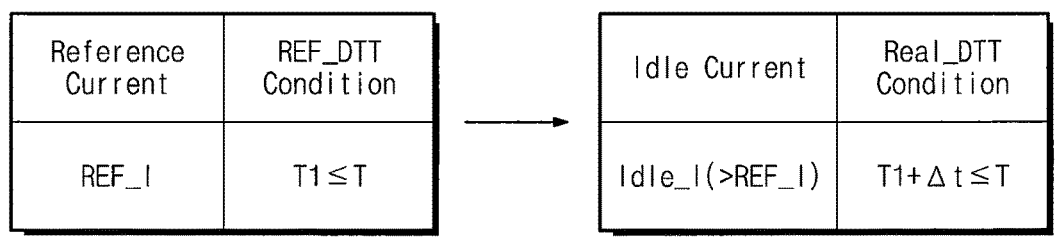
FIG. 6 is a block diagram illustrating a temperature table according to some embodiments of the inventive concepts.
Figure 7:
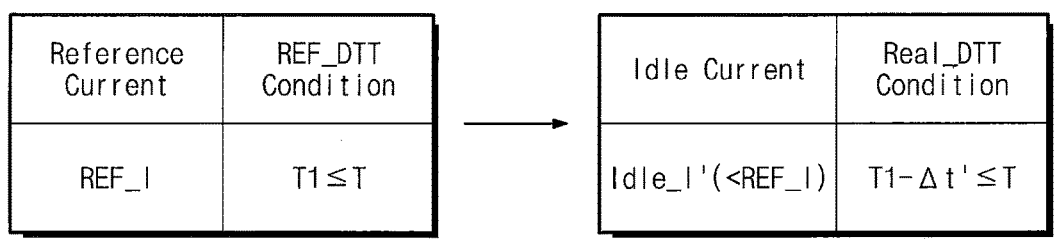
FIG. 7 is a block diagram illustrating a temperature table according to some embodiments of the inventive concepts.

FIGS. 6 and 7 are block diagrams illustrating temperature tables according to some embodiments of the inventive concepts. Referring to FIGS. 6 and 7, tables for performing temperature control in a single mode are provided.

Referring to FIGS. 2, 6, and 7, the reference temperature control table REF_DTT may include a start temperature information T that may be used to adjust an operating speed of the storage device and may include the reference current value REF_I corresponding to the start temperature information T. The reference temperature control table REF_DTT may be information that is previously stored in the memory controller 220.

When reading the idle current value Idle_I from the security area SA of the nonvolatile memory 210, the memory controller 220 may compare the reference current value REF_I with the idle current value Idle_I. According to a comparison result, the memory controller 220 may set the real temperature control table REAL_DTT that may include the start temperature at which the storage device 200 may begin operating speed control of the storage device 200.

When the idle current value Idle_I of the storage device 200 is equal to the reference current value REF_I, the memory controller 220 may control the operating speed of the storage device 200 according to the reference temperature control table REF_DTT and a temperature T obtained from the temperature sensor 230. For example, when obtained temperature T is equal to or greater than first temperature T1, the memory controller 220 may reduce the operating speed of the storage device 200.

Referring to FIG. 6, it will be assumed that the idle current value Idle_I of the storage device 200 is greater than the reference current value REF_I. A power consumption of the storage device 200 may be proportional to the idle current value Idle_I. For example, a greater idle current value Idle_I may correspond to a higher basic power consumption of the storage device 200. Accordingly, the memory controller 220 may set a start temperature to T1+Δt by increasing the start temperature, at which the speed control of the storage device 200 starts, from a basic value T1. When the temperature T sensed from the temperature sensor 230 is equal to or greater than the start temperature T1+Δt, the memory controller 220 may reduce the operating speed of the storage device 200 based on the real temperature control table REAL_DTT including the start temperature T1+Δt.

Referring to FIG. 7, it will be assumed that an idle current value Idle_I' of the storage device 200 is smaller than the reference current value REF_I. A smaller idle current value Idle_I' may correspond to a lower basic power consumption of the storage device 200. Accordingly, the memory controller 220 may set a start temperature to T1−Δt' by decreasing start temperature, at which the speed control of the storage device 200 starts, from the basic value T1. When the temperature T sensed from the temperature sensor 230 is greater than or equal to the start temperature T1−Δt', the memory controller 220 may reduce the operating speed of the storage device 200 based on the real temperature control table REAL_DTT including the start temperature T1−Δt'.

There are multiple ways in which the memory controller 220 may reduce the operating speed of the storage device 200. For example, the memory controller 220 may reduce the operating speed of the storage device 200 by delaying transmission timing of a response to a request received from a host device (not shown), by delaying a time interval for which the nonvolatile memory 210 is accessed, or by decreasing the number of portions accessed simultaneously in the nonvolatile memory 210. If the operating speed of the storage device 200 is reduced, a heat value of the storage device 200 may be reduced and, thus, the temperature of the storage device 200 may decrease.

Figure 9:
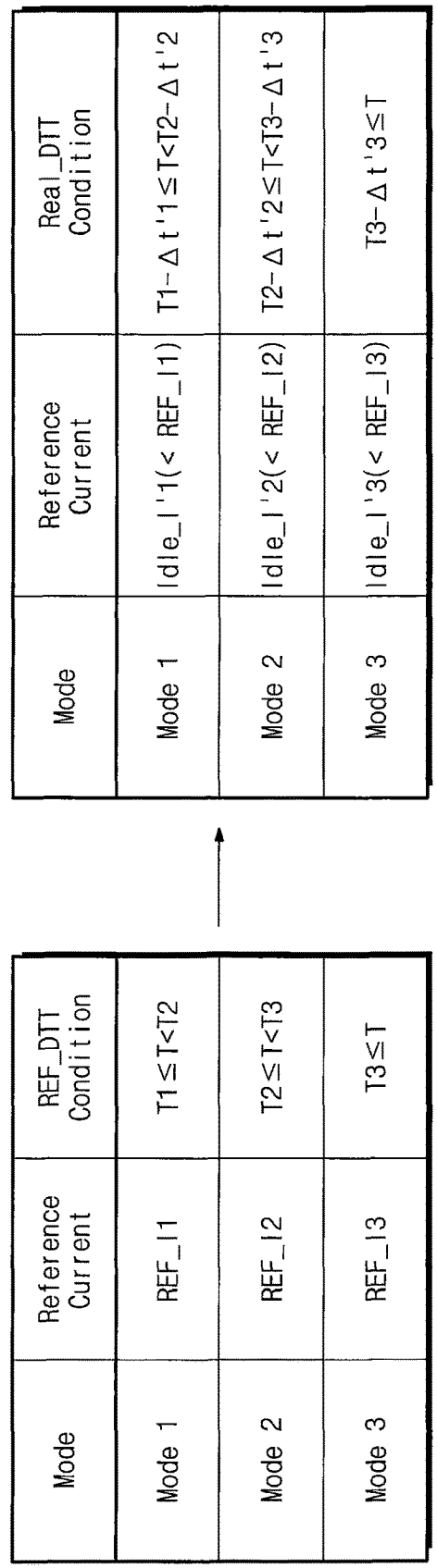
FIG. 9 is a block diagram illustrating a temperature table according to some embodiments of the inventive concepts.

FIGS. 8 and 9 are block diagrams illustrating temperature tables according to some embodiments of the inventive concepts. Referring to FIGS. 8 and 9, tables for performing operating speed control in a plurality of modes M1 to M3 are provided.

Referring to FIGS. 2 and 8, the memory controller 220 may operate in a first mode M1, a second mode M2, or a third mode T3 according to the temperature sensed from the temperature sensor 230 and the idle current value Idle_I of the storage device 200.

Referring to the reference temperature control table REF_DTT in FIG. 8, when idle current Idle_I is identical to reference current, the memory controller 220 may operate in the first mode M1 if temperature T periodically detected from the temperature sensor 230 is equal to or greater than first temperature T1 and lower than second temperature T2 (T1≤T<T2, first temperature range). At this point, a current corresponding to the first temperature range is a first reference current I1.

In each cycle, the memory controller 220 may operate in the second mode M2 if the detected temperature T2 is equal to or greater than the second temperature T2 and lower than third temperature T3 (T2≤T<T3, second temperature range). At this point, a current corresponding to the second temperature range is a second reference current I2. In each cycle, the memory controller 220 may operate in the third mode T3 if the detected temperature T is equal to or greater than the third temperature T3 (T3≤T, third temperature range). At this point, a current corresponding to the third temperature range is a third reference current I3.

The memory controller 230 may generate the actual temperature control table REAL_DTT based on the idle current of the storage device 200. With reference to FIG. 8, it will be assumed that an idle current value Idle_I of the storage device is greater than a reference current value REF_I. Specifically, when a first idle current value Idle_I1 is greater than a first reference current value REF_I1, boundary values of the temperature range to start real operation control may increase. When the temperature T detected through the temperature sensor 230 is equal to or greater than a first boundary temperature T1+Δt1 and is smaller than a second boundary temperature T2+Δt2, the memory controller 220 may operate in the first mode M1.

When a second idle current value Idle_I2 is greater than a second reference current value REF_I2, the memory controller 220 may operate in the second mode M2 within the range where the temperature T detected through the temperature sensor 230 is equal to or greater than the second boundary temperature T2+Δt2 and is smaller than a third boundary temperature T3+Δt3.

Finally, when a third idle current value Idle_I3 is greater than a third reference current value REF_I3, the memory controller 220 may operate in the third mode M3 within the range where the temperature T detected through the temperature sensor 230 is equal to or greater than the third boundary temperature T3+Δt3. According to example embodiments of inventive concepts, the increments Δt1 to Δt3 may have different sizes, respectively. However, embodiments of inventive concepts are not limited thereto and the increments Δt1 to Δt3 of the temperature may have the same size.

Referring to FIG. 8, the first idle current value Idle_I1 is idle current of the storage device 200 within the first temperature range (T1≤T<T2). The second idle current value Idle_I2 is idle current of the storage device 200 within the second temperature range (T2≤T<T3). The third idle current value Idle_I3 is idle current of the storage device 200 within the third temperature range (T3≤T).

It will be assumed that the reference temperature control table REF_DTT shown in FIG. 9 is identical to the reference temperature control table REF_DTT shown in FIG. 8. Referring to FIGS. 2, 8, and 9, it is assumed that an idle current value Idle_I' of the storage device 200 is smaller than the reference current value REF_I. Specifically, if a fourth idle current value Idle_I'1 is smaller than a first reference current value REF_I1, boundary values of a temperature range to control a real operation may decrease. If the temperature T detected through the temperature sensor 230 is equal to or greater than fifth boundary temperature T1−Δt'1 and lower than sixth boundary temperature T2−Δt'2, the memory controller 220 may operate in the first mode M1.

If a fifth idle current value Idle_I'2 is smaller than a second reference current value REF_I2, the memory controller 220 may operate in the second mode M2 within the range where the temperature T detected through the temperature sensor 230 is equal to or greater than sixth boundary temperature T2−Δt'2 and smaller than seventh boundary temperature T3−Δt'3.

Finally, when a sixth idle current value Idle_I'3 is smaller than a third reference current value REF_I3 and the temperature T detected through the temperature sensor 230 is equal to or greater than seventh boundary temperature T3−Δt'3, the memory controller 220 operates in the third mode M3. According to example embodiments of inventive concepts, temperature decrements Δt'1~Δt'3 may have different sizes. However, example embodiments are not limited thereto and the temperature decrements Δt'1~Δt'3 may have the same size.

Referring to FIGS. 8 and 9, in the first mode M1, the memory controller 220 may control operating speed of the storage device 200 at first speed. The first speed may be lower than a normal operating speed. In the second mode M2, the memory controller 220 may control operating speed of the storage device 200 at a second speed. The second speed may be lower than the first speed. In the third mode M3, the memory controller 220 may control the operating speed of the storage device 200 at a third speed. The third speed may be lower than the second speed. The operation of the memory controller 220 is not limited to the three modes M1 to M3. For example, the operating speed of the storage device 200 may be controlled with more modes or less modes.

Figure 10:
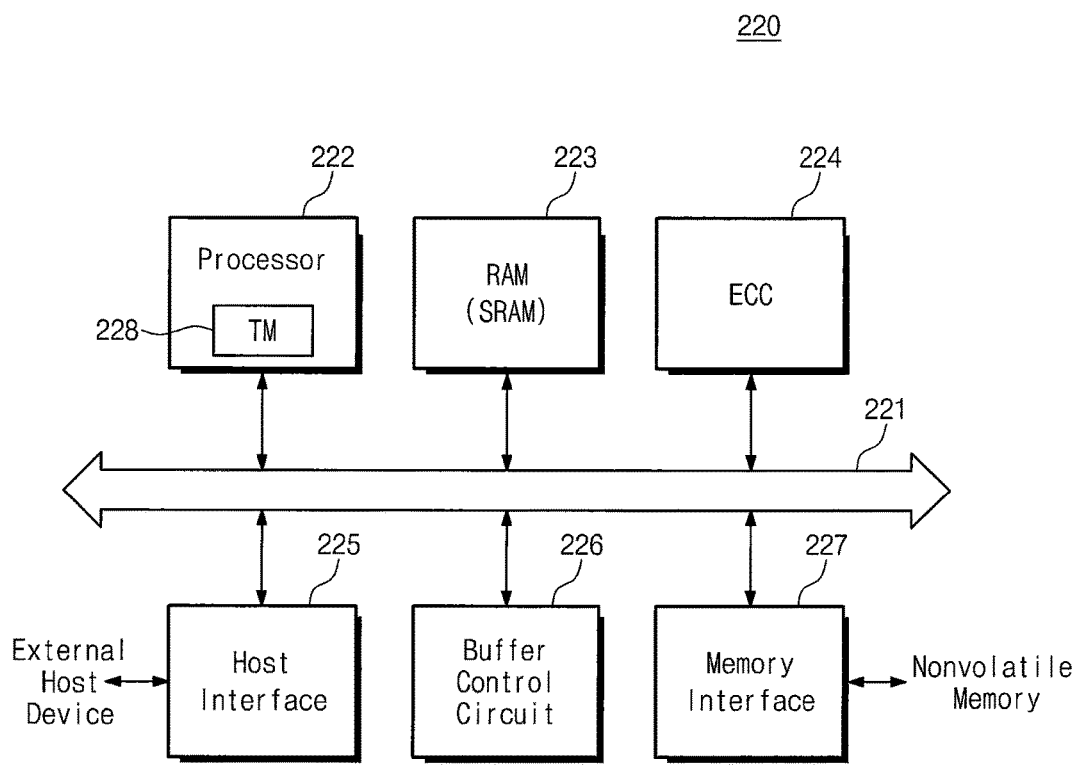
FIG. 10 is a block diagram schematically illustrating a memory controller according to some embodiments of the inventive concepts.

FIG. 10 is a block diagram schematically illustrating a memory controller according to some embodiments of the inventive concepts. Referring to FIGS. 2 and 10, the memory controller 220 may include a bus 221, a processor 222, a RAM 223, an error correction code block (ECC) 224, a host interface 225, a buffer controller 226, and/or a memory interface 227.

The bus 221 may be configured to provide a channel between components of the memory controller 220.

The processor 222 may control the overall operation of the memory controller 220 and perform a logical operation. The processor 222 may communicate with an external host device (not shown) through the host interface 225 and communicate with the nonvolatile memory 210 through the memory interface 227. The processor 222 may communicate with RAM 240 through the buffer control circuit 226.

The processor 222 may include a temperature manager TM. The temperature manager TM may be implemented with software driven by the processor 222 or implemented with hardware constituting the processor 222. Alternatively, the temperature manager TM may be implemented with a combination of software driven by the processor 222 and hardware constituting the processor 222.

The RAM 223 may be used as a working memory, a cache memory or a buffer memory of the processor 222. The RAM 223 may store codes and commands that the processor 222 executes. The RAM 223 may store data processed by the processor 222. The RAM 223 may include a static RAM (SRAM).

The ECC 224 may perform error correction. The ECC 224 may perform error correction encoding based on data to be written into the nonvolatile memory 210 through the memory interface 227. Error-correction-encoded data may be transmitted to the nonvolatile memory 210 through the memory interface 227. The ECC 224 may perform error correction encoding on data received through the memory interface 227. The ECC 224 may be included in the memory interface 227 as a component of the memory interface 227.

The host interface 225 may be configured to communicate with an external host device (not shown) or the nonvolatile memory device 210 according to the control of the processor 222. The host interface 225 may be configured to perform communication based on at least one of various communication protocols such as USB (Universal Serial Bus), SATA (Serial AT Attachment), SAS (Serial Attached SCSI), HSIC (High Speed Interchip), SCSI (Small Computer System Interface), Firewire, PCI (Peripheral Component Interconnection), PCIe (PCI express), NVMe (NonVolatile Memory express), UFS (Universal Flash Storage), SD (Secure Digital), MMC (MultiMedia Card), and eMMC (embedded MMC).

The buffer control circuit 226 may be configured to control the RAM 240 according to the control of the processor 222.

The memory interface 227 may be configured to communicate with the nonvolatile memory 210 according to the control of the processor 222. As described with reference to FIG. 2, in some embodiments, the memory interface 227 may communicate with the nonvolatile memory 210 through an input/output channel using a command, an address, and data. The memory interface 227 may communicate with the nonvolatile memory 210 through a control channel using a control signal.

In some embodiments, if the storage device 200 is not provided with the RAM 240, the memory controller 220 may not be provided with the buffer control circuit 226.

In some embodiments, the processor 222 may control the memory controller 220 using codes. The processor 222 may load codes from a nonvolatile memory (e.g., read only memory) provided in the memory controller 220. In some embodiments of the inventive concepts, the processor 222 may load codes from the nonvolatile memory 210 through the memory interface 227.

In some embodiments, the bus 221 of the memory controller 220 may be classified into a control bus and a data bus. The data bus may be configured to transmit data in the memory controller 220, and the control bus may be configured to transmit control information, such as a command and an address, in the memory controller 220. In some embodiments, the data bus and the control bus may be separated from each other and may not interfere with each other or may not have an influence on each other. In some embodiments, the data bus may be connected to the host interface 225, the buffer control circuit 226, the ECC 224, and the cluster interface 227. The control bus may be connected to the host interface 225, the processor 222, the buffer control circuit 226, the RAM 223, and the memory interface 227.

Figure 11:
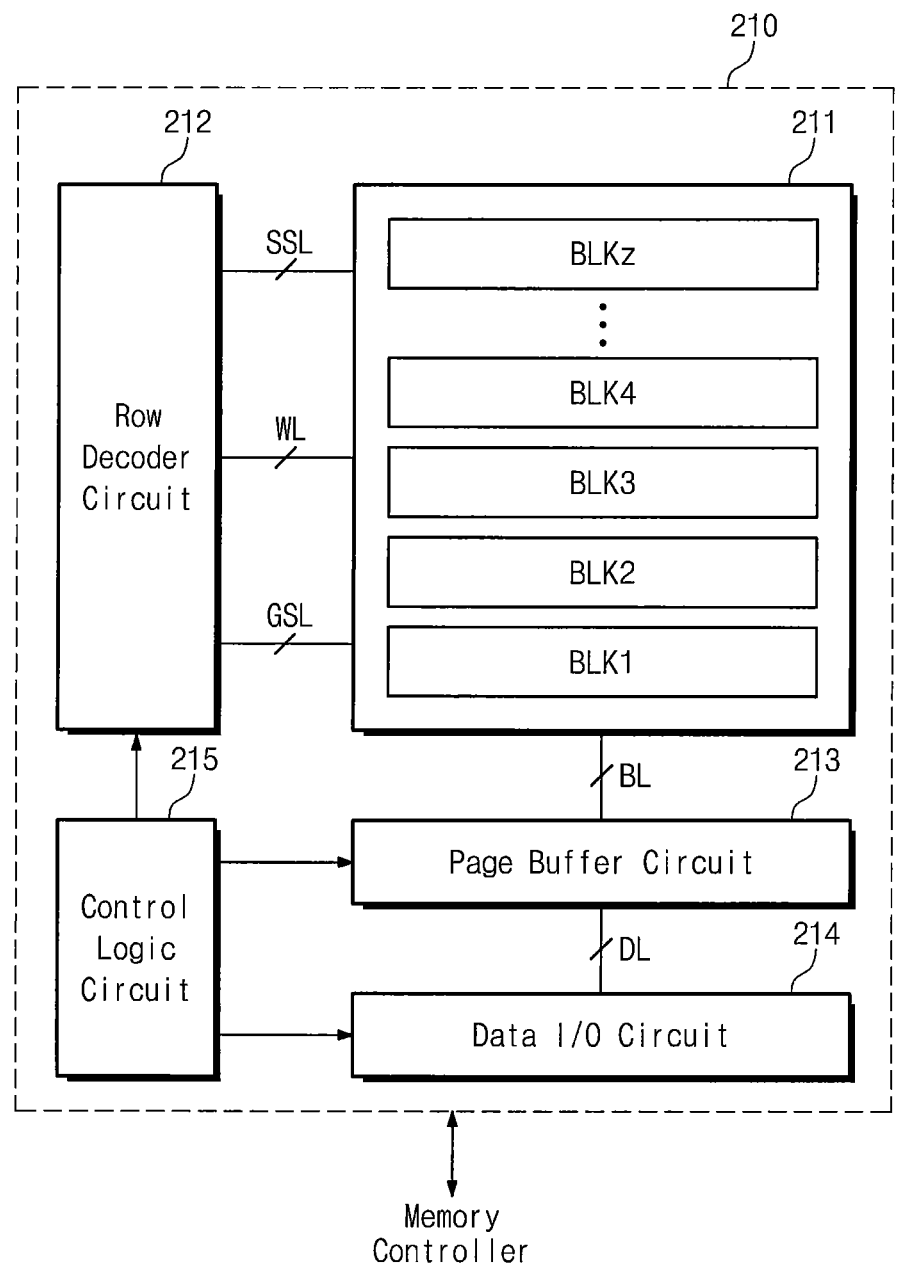
FIG. 11 is a block diagram schematically illustrating a nonvolatile memory according to some embodiments of the inventive concepts.

FIG. 11 is a block diagram schematically illustrating a nonvolatile memory according to some embodiments of the inventive concepts. Referring to FIGS. 2 and 11, the nonvolatile memory device 210 may include a memory cell array 211, a row decoder circuit 212, a page buffer circuit 213, a data input/output (I/O) circuit 214, and/or a control logic circuit 215.

The memory cell array 211 may include a plurality of memory blocks BLK1 to BLKz. Each of the memory blocks BLK1 to BLKz may include a plurality of memory cells. Each of the memory blocks BLK1 to BLKz may be connected to the address decoder circuit 212 through at least one ground selection line GSL, a plurality of word lines WL, and at least one string selection line SSL. Each of the memory blocks BLK1 to BLKz may be connected to a page buffer circuit 213 through a plurality of bitlines BL. The memory blocks BLK1 to BLKz may be commonly connected to the bitlines BL.

Memory cells of the memory blocks BLK1 to BLKz may have the same structure. In some embodiments, each of the memory blocks BLK1 to BLKz may be a unit of an erase operation. Memory cells of the memory cell array 211 may be erased in units of a single memory block. The memory blocks BLK1 to BLKz belonging to a single memory block may be erased at the same time. In some embodiments, each of the memory blocks BLK1 to BLKz may be divided into a plurality of sub-blocks and each of the sub-blocks may be a unit of an erase operation. In some embodiments, at least one of the memory blocks BLK1 to BLKz may be a security area SA. A memory block that is within the security area SA may include bad block information and/or idle current information of the storage device 200.

The row decoder circuit 212 may be connected to the memory cell array 211 through a plurality of ground selection lines GSL, a plurality of word lines WL, and a plurality of string selection lines SSL. The row decoder circuit 212 may decode an address received from the memory controller 220 through an input/output channel and control voltages applied to the string selection lines SSL, the word lines WL, and the ground selection lines GSL according to the decoded address.

For example, during a program operation, the address decoder circuit 212 may apply a program voltage VPGM to a selected word line of a selected memory block indicated by the address and apply a pass voltage VPASS to unselected word lines of the selected memory block. During a read operation, the row decoder circuit 212 may apply a select read voltage VRD to the selected word line of the selected memory block indicated by the address and apply an unselect read voltage VREAD to unselected word lines of the selected memory. During an erase operation, the row decoder circuit 212 may apply erase voltages (e.g., a ground voltage or low voltage having similar levels to the ground voltage) to word lines of the selected memory block indicated by the address.

The page buffer circuit 213 may be connected to the memory cell array 211 through a plurality of bit lines BL. The page buffer circuit 213 may be connected to the data I/O circuit 214 through a plurality of data lines DL. The page buffer circuit 213 may operate according to the control of the control logic 215.

During a program operation, the page buffer circuit 213 may store the data to be programmed into the memory cells. The page buffer circuit 213 may apply voltages to a plurality of bit lines BL based on stored data. For example, the page buffer circuit 213 may function as a write driver. During a read operation, the page buffer circuit 213 may sense voltages of the bit lines BL and store a sensing result. For example, the page buffer circuit 213 may function as a sense amplifier.

The data I/O circuit 214 may be connected to the page buffer circuit 213 through a plurality of data lines DL. The data I/O circuit 214 may output data read by the page buffer circuit 213 to the memory controller 220 through an input/output channel and transmit data received from the memory controller 220 through the input/output channel to the page buffer circuit 213.

The control logic circuit 215 may receive a command from the memory controller 220 through the input/output channel and a control signal from the memory controller 220 through the control channel. The control logic 215 may receive the command received through the input/output channel in response to the control signal, route an address received through the input/output channel to the row decoder circuit 212, and route the data received through the input/output channel to the data input/output circuit 214. The control logic circuit 215 may decode the received command and control the nonvolatile memory device 210 according to the decoded command.

In example embodiments, during a read operation, the control logic circuit 215 may generate a data strobe signal DQS from a read enable signal /RE received from the cluster controller 220 through the control channel. The generated data strobe signal DQS may be output to the memory controller 220. During a write operation, the control logic circuit 215 may receive the data strobe signal DQS from the memory controller 220 through the control channel.

Figure 12:
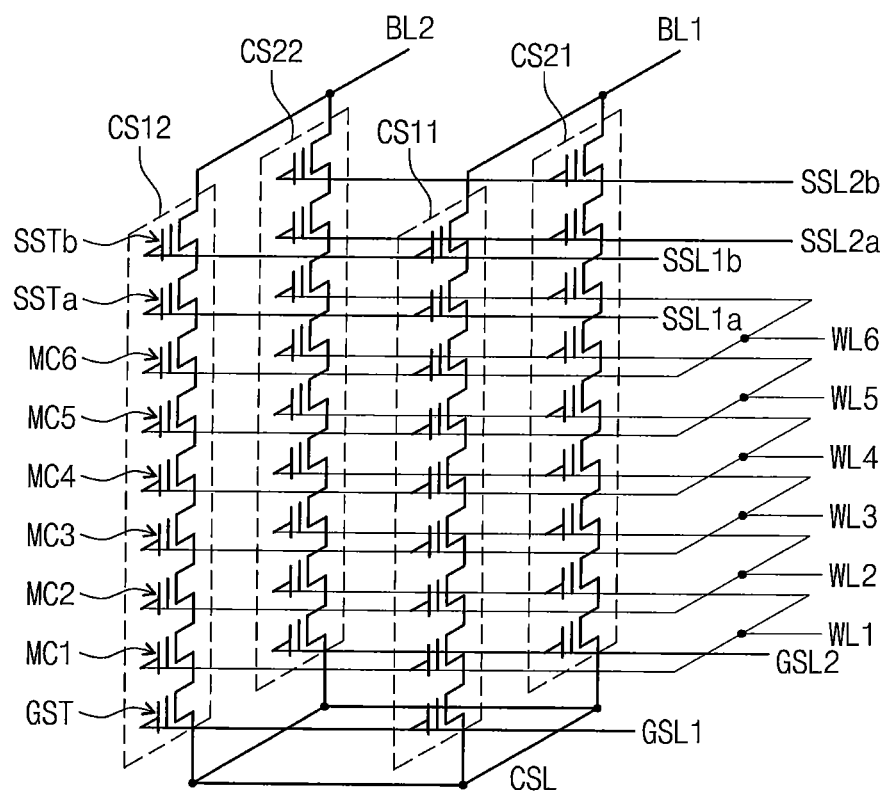
FIG. 12 is a circuit diagram schematically illustrating a memory block according to some embodiments of the inventive concepts.
Figure 12:
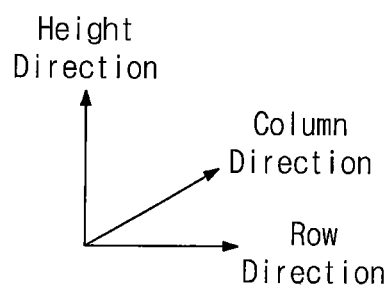

FIG. 12 is a circuit diagram schematically illustrating a memory block according to some embodiments of the inventive concepts. Referring to FIG. 12, a memory block BLKa may include a plurality of cell strings CS11 to CS21 and CS12 to CS22. The cell strings CS11 to CS21 and CS12 to CS22 may be arranged in a row direction and a column direction to form rows and columns.

For example, the cell strings CS11 and CS12 arranged in the row direction may form a first row, and the cell strings CS21 and CS22 arranged in the row direction may form a second row. The cell strings CS11 and CS21 arranged in the column direction may form a first column, and the cell strings CS12 and CS22 arranged in the column direction may form a second column.

For example, the cell strings CS11 and CS12 arranged in the row direction may form a first row, and the cell strings CS21 and CS22 arranged in the row direction may form a second row. The cell strings CS11 and CS21 arranged in the column direction may form a first column, and the cell strings CS12 and CS22 arranged in the column direction may form a second column.

Each cell string may include a plurality of cell transistors. The cell transistors may include a ground selection transistor GST, memory cells MC1 to MC6, and string selection transistors SSTa and SSTb. The ground selection transistor GST, the memory cells MC1 to MC6, and the string selection transistors SSTa and SSTb of each cell string may be stacked in a direction perpendicular to a plane on which the cell strings CS11 to CS21 and CS12 to CS22 are arranged in a matrix of rows and columns (e.g., a plane on a substrate of the memory block BLKb).

The plurality of cell transistors may be charge trap type transistors having threshold voltages that vary depending on the amount of charges trapped to an insulating layer.

Lowermost of the ground selection transistors GST may be commonly connected to the common source line CSL.

Control gates of ground selection transistors GST of the cell strings CS11 to CS12 of the first row may be commonly connected to a ground selection line GSL1, and control gates of ground selection transistors GST of the cell strings CS21 and CS22 of the second row may be commonly connected to a ground selection line GSL2. [0092] Cell strings of different rows may be connected to different string selection lines. String selection transistors of the same height (or order) of the same row may be connected to the same string selection line. String selection transistors of different heights (or orders) of the same row may be connected to different string selection lines.

In some embodiments, each of the cell strings may include more than one ground selection transistor GST. The ground selection transistors GST of different heights of the same row may be connected to different ground selection lines. In some embodiments, ground selection lines connected to ground selection transistors of different heights of the same row may be connected to each other to be commonly controlled. In some embodiments, the ground selection lines connected to ground selection transistors of the same height of different rows may be connected to each other to be commonly controlled. In other words, the ground selection lines connected to ground selection transistors may be connected to each other to be commonly controlled.

Memory cells disposed at the same height (or order) from a substrate (or ground selection transistors GST) may be connected to a single word line, and memory cells disposed at different heights (or orders) may be connected to different word lines WL1 to WL6, respectively. For example, memory cells MC1 may be commonly connected to the word line WL1. Memory cells MC2 may be commonly connected to the word line WL2. Memory cells MC3 may be commonly connected to the word line WL3. Memory cells MC4 may be commonly connected to the word line WL4. Memory cells MC5 may be commonly connected to the word line WL5. Memory cells MC6 may be commonly connected to the word line WL6.

In a first string selection transistor SSTa of the same height (or order) of the cell strings CS11 to CS21 and CS12 to CS22, first string selection transistors SSTa of different rows may be connected to different string selection lines SSL1a to SSL2a, respectively. For example, first string selection transistors SSTa of the cell strings CS11 and CS12 may be commonly connected to a string selection line SSL1a. First string selection transistors SSTa of the cell strings CS21 and CS22 may be commonly connected to a string selection line SSL2a.

In a second string selection transistor SSTb of the same height (or order) of the cell strings CS11 to CS21 and CS12 to CS22, second string selection transistors SSTb of different rows may be connected to different string selection lines SSL1b to SSL2b, respectively. For example, second string selection transistors SSTb of the cell strings CS11 and CS12 may be commonly connected to a string selection line SSL1b. First string selection transistors SSTb of the cell strings CS21 and CS22 may be commonly connected to a string selection line SSL2b.

In other words, cell strings of different rows may be connected to different string selection lines. String selection transistors of the same height (or order) of the same row may be connected to the same string selection line. String selection transistors of different heights (or orders) of the same row may be connected to different string selection lines.

In some embodiments, string selection transistors of cell strings of the same row may be connected to a single string selection line. For example, string selection transistors SSTa and SSTb of a first row may be commonly connected to a single string selection line. String selection transistors SSTa and SSTb of cell strings CS21 and CS22 of a second row may be commonly connected to a single string selection line.

Columns of a plurality of cell strings CS11 to CS21 and CS12 to CS22 may be connected to different bit lines BL1 and BL2, respectively. For example, string selection transistors SSTb of cell strings CS11 to CS21 of a first column may be commonly connected to a bit line 13L1. String selection transistors SST of cell strings CS12 to CS22 of a second column are commonly connected to a bit line BL2.

The cell strings CS11 and CS12 may form a first plane. The cell strings CS21 and CS22 may form a second plane.

In the memory block BLKa, memory cells of each height of each plane may form a physical page. The physical page may be write and read units of the memory cells MC1 to MC6. For example, a single plane of the memory block BLKa may be selected by the string selection lines SSL1a, SSL1b, SSL2a, and SSL2b. When the string selection lines SSL1a and SSL1b are supplied with a turn-on voltage and the string selection lines SSL2a and SSL2b are supplied with a turn-off voltage, cell strings CS11 and CS12 of the first plane may be connected to the bit lines BL1 and BL2. That is, the first plane may be selected. When the string selection lines SSL2a and SSL2b are supplied with a turn-on voltage and the string selection lines SSL1a and SSL1b are supplied with a turn-off voltage, cell strings CS21 and CS22 of the second plane may be connected to the bit lines BL1 and BL2. That is, the second plane may be selected. In the selected plane, a single row of the memory cells MC may be selected by the word lines WL1 to WL6. In the selected row, a select voltage may be applied to the second word line WL2 and an unselect voltage may be applied to the other word lines WL1 and WL3 to WL6. That is, voltages of the string selection lines SSL1a, SSL1b, SSL2a, and SSL2b and the word lines WL1 to WL6 may be adjusted to select a physical page corresponding to the second word line WL2 of the second plane. In the memory cells MC2 of the selected physical page, a write or read operation may be performed.

Two or more bits may be written into each of the memory cells MC. Bits written into each of the memory cells belonging to a single physical page may form logical pages. A first bit written into each of the memory cells MC belonging to a single physical page may form a first logical page. An Nth bit written into each of the memory cells MC belonging to a single physical page may form the Nth logical page. A logical page may be a data access unit. When a read operation is performed in a single physical page, data may be accessed in units of logical pages.

In the memory block BLKa, an erase operation may be performed in units of memory blocks or sub-blocks. When the erase operation is performed in units of memory blocks, all memory cells MC of the memory block BLKa may be erased at the same time according to a single erase request. When the erase operation is performed in units of sub-blocks, some of the memory cells MC of the memory block BLKa may be erased at the same time according to a single erase request and the others may be erase-inhibited. A word line connected to erased memory cells MC may be supplied with a low voltage (e.g., a ground voltage or a low voltage having a similar level to the ground voltage), and a word line connected to erase-inhibited memory cells MC may be floated.

The memory block BLKa shown in FIG. 12 is merely a non-limiting example. Some embodiments may not be limited to the memory block BLKa shown in FIG. 12. For example, the number of rows of cell strings may increase or decrease. As the number of the rows of the cell strings varies, the number of string selection lines or the number of ground selection lines, and the number of cell strings connected to a single bitline may also vary.

The number of columns of cell strings may increase or decrease. As the number of columns of cell strings varies, the number of bitlines connected to the columns of the cell strings and the number of cell strings connected to a single string selection line may also vary.

The height of cell strings may increase or decrease. For example, the number of ground selection transistors, memory cells or string selection transistors stacked on the respective cell strings may increase or decrease.

In some embodiments, memory cells MC that are connected to a single word line and belong to a single row may correspond to at least three logical pages. For example, k bits (k being an integer greater than or equal to 2) may be programmed into a single memory cell. In memory cells MC that are connected to a single word line and belong to a single row, k bits programmed into each of the memory cell MC may form k logical pages.

As described above, the memory block BLKa may be provided in a three-dimensional (3D) memory array. The 3D memory array may be monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array may be directly deposited on the layers of each underlying level of the array.

In some embodiments, the memory block BLKa provided in the 3D memory array may include vertical NAND strings that are vertically oriented such that at least one memory cell may be located over another memory cell. The at least one memory cell may comprise a charge trap layer. Each vertical NAND string may include at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

Figure 13:
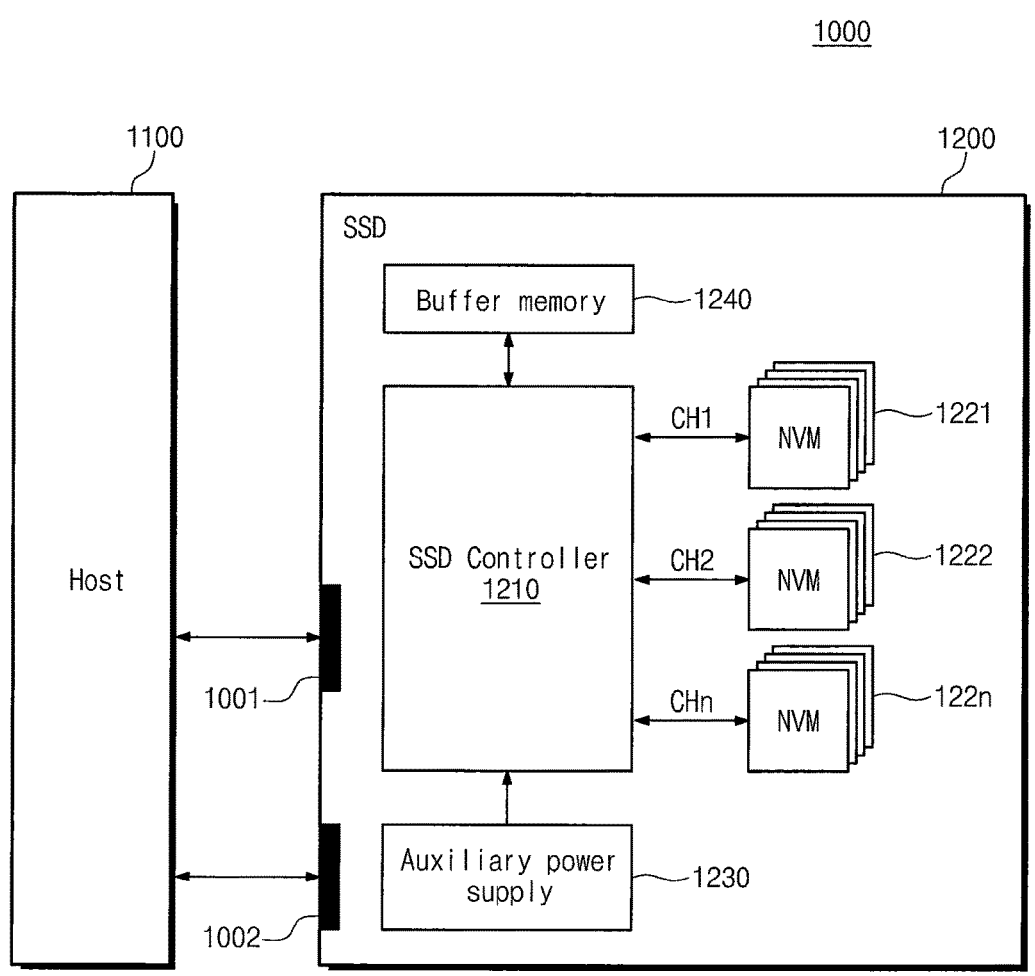
FIG. 13 is a block diagram schematically illustrating a solid state drive (SSD) system according to some embodiments of the inventive concepts.

FIG. 13 is a block diagram schematically illustrating a solid state drive (SSD) system according to some embodiments of the inventive concepts. Referring to FIG. 13, an SSD system 1000 may include a host 1100 and an SSD 1200. The SSD 1200 may exchange a signal SIG with the host 1100 through a signal connector 1001 and receive power PWR through a power connector 1002. The SSD 1200 may include an SSD controller 1210, a plurality of flash memories 1221 to 122n, an auxiliary power supply 1230, and a memory buffer 1240. When the SSD controller 1210 is supplied with the power PWR from the power connector 1002, the SSD controller 1210 may read information of idle current Idle_I stored in a security area SA of the nonvolatile memories 1221 to 122n. The information of the idle current Idle_I may be stored in a zeroth way and a first way of nonvolatile memories connected to the same channel. Also the information of the idle current Idle_I may be stored in a zeroth way of nonvolatile memories connected to different channels. The information of the idle current Idle_I may be stored together with a firmware code or an image. The SSD controller 1210 may operate based on the operating method described with reference to FIGS. 2 to 5.

The auxiliary power supply 1230 may be connected to the host 1100 through the power connector 1002. The auxiliary power supply 1230 may be supplied with power PWR from the host 1100. The auxiliary power supply 1230 may supply power to the SSD system 1000 when power supply from the host 1100 is disrupted. In some embodiments, the auxiliary power supply 1230 may be inside or outside the SSD 1200. For example, the auxiliary power supply 1230 may be on a mainboard and supply auxiliary power to the SSD 1200.

The buffer memory 1240 may function as a buffer memory. For example, the buffer memory 1240 may temporarily store data received from the host 1100 or data received from the flash memories 1221 to 122n or may temporarily store metadata (e.g., mapping table) of the flash memories 1221 to 122n. The buffer memory 1240 may include a volatile memory such as DRAM, SDRAM, DDR SDRAM, LPDDR SDRAM, and SRAM or nonvolatile memory such as FRAM, ReRAM, STT-MRAM, and PRAM.

Figure 14:
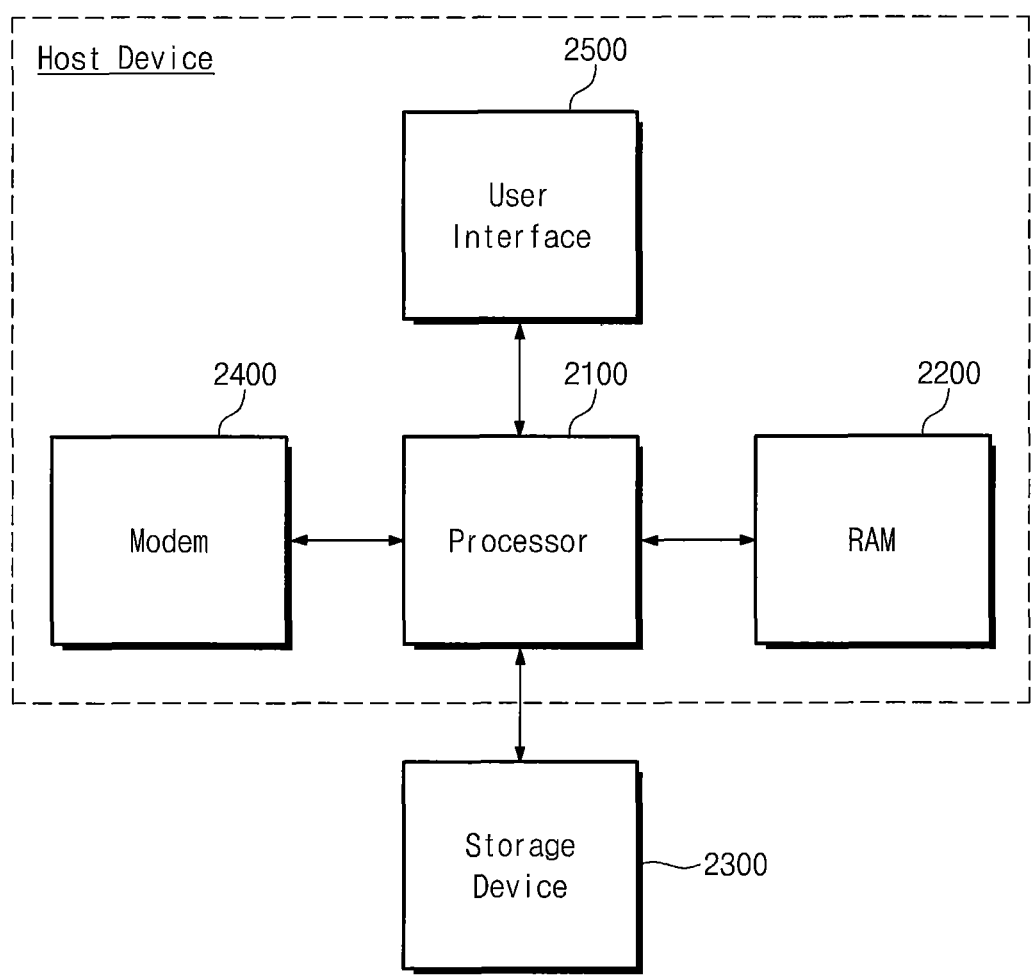
FIG. 14 is a block diagram schematically illustrating a computing device according to some embodiments of the inventive concepts.

FIG. 14 is a block diagram schematically illustrating a computing device according to some embodiments of the inventive concepts. Referring to FIG. 14, a computing device 2000 may include a processor 2100, a RAM 2200, a storage device 2300, a modem 2400, and/or a user interface 2500.

The processor 2100 may control the overall operation of the computing device 2000 and performs a logical operation. For example, the processor 2100 may include a system-on-chip (SoC). The processor 2100 may be a general-purpose processor, a special-purpose processor or an application processor.

The RAM 2200 may communicate with the processor 2100. The RAM 2200 may be a main memory of the processor 2100 or the computing device 2000. The processor 2100 may temporarily store a code or data in the RAM 2200. The processor 2100 may execute a code and process data using the RAM 2200. The processor 2100 may execute various types of software such as an operating system and an application using the RAM 2200. The processor 2100 may control the overall operation of the computing device 1000 using the RAM 2200. The RAM 2200 may include a volatile memory such as a static RAM (SRAM), a dynamic RAM (DRAM), and a synchronous DRAM (SDRAM), or may include a nonvolatile memory such as a phase-change RAM (PRAM), a magnetic RAM (MRAM), a resistive RAM (RRAM), and a ferroelectric RAM (FeRAM).

The storage device 2300 may communicate with the processor 2100. The storage device 2300 may store data for a relatively long time. That is, the processor 2100 may store data that needs to be retained for a long period of time in the storage device 2300. The storage device 2300 may store a boot image to drive the computing device 2000. The storage device 2300 may store source codes of various types of software such as an operating system and an application. The storage device 2300 may store data processed by various types of software such as an operating system and an application.

In some embodiments, the processor 2100 may load the source codes stored in the storage device 2300 to the RAM 2200 and execute the codes loaded to the RAM 2200 to drive the various types of software such as an operating system and an application. The processor 2100 may load the data stored in the storage device 2300 to the RAM 2200 and process the data loaded to the RAM 2200. The processor 2100 may store data that needs to be retained for a long period of time, among the data stored in the RAM 2200, in the storage device 2300.

The storage device 2300 may include a nonvolatile memory such as a phase-change RAM (PRAM), a magnetic RAM (MRAM), a resistive RAM (RRAM), and a ferroelectric RAM (FRAM).

The modem 2400 may communicate with an external device according to the control of the processor 2100. For example, the modem 2400 may perform wired or wireless communications with an external device. The modem 2400 may perform communications based on one or more of a plurality of wireless communication techniques or protocols including, for example, LTE (Long Term Evolution), WiMax, GSM (Global System for Mobile communication), CDMA (Code Division Multiple Access), Bluetooth, NFC (Near Field Communication), WiFi, and RFID (Radio Frequency Identification), and/or one or more of a plurality of wired communication techniques or protocols including, for example, USB (Universal Serial Bus), SATA (Serial AT Attachment), SCSI (Small Computer Small Interface), Firewire, PCI (Peripheral Component Interconnection), PCIe (PCI express), NVMe (NonVolatile Memory express), UFS (Universal Flash Storage), SD (Secure Digital), SDIO, UART (Universal Asynchronous Receiver Transmitter), SPI (Serial Peripheral Interface), HS-SPI (High Speed SPI), RS232, I2C (Inter-integrated Circuit), HS-I2C, I2S, (Integrated-interchip Sound), S/PDIF (Sony/Philips Digital Interface), MMC (MultiMedia Card), eMMC (embedded MMC).

The user interface 2500 may communicate with a user according to the control of the processor 2100. For example, the user interface 2500 may include user input interfaces such as a keyboard, a keypad, a button, a touch panel, a touch screen, a touch pad, a touch ball, a camera, a microphone, a gyroscope sensor, and a vibration sensor. The user interface 1500 may include user output interfaces such as a liquid crystal display (LCD), an organic light emitting diode (OLED) display, an active matrix OLED (AMOLED), an LED, a speaker, and a monitor.

The storage device 2300 may include a storage device 200 according to example embodiments of inventive concepts. The processor 2100, the RAM 2200, the modem 2400, and the user interface 2500 may constitute a host device communicating with the storage device 2300.

In some embodiments, the computing device 2000 may further include a temperature sensor or may be configured to receive temperature information from the temperature sensor 230 (see FIG. 1) incorporated in the storage device 2300. The processor 2100 may adjust an operating speed of the storage device 2300 according to temperature detected from the temperature sensor 230. Specifically, the processor 2100 may set operating speed control start temperature of the storage device 2300 to information of the temperature detected from the temperature sensor 2300 based on an idle current value Idle_I of the storage device 2300.

In some embodiments of the inventive concepts, the RAM 2200, the modem 2400 or the user interface 2500 may adjust operating speed of the storage device 2300 according to temperature, as described with reference to FIGS. 1 to 12. For example, the RAM 2200, the modem 2400 or the user interface 2500 may adjust the operating speed of the storage device 2300 according to internal control or the control of the processor 2100.

As described above, reference, or start, temperature at which temperate control starts is controlled according to idle current of a storage device. When performance of the storage device is adjusted, the idle current is reflected to improve operating speed. Accordingly, a storage device with improved operating speed and an operating method of the storage device are provided.

While the present disclosure has been particularly shown and described with reference to exemplary embodiments thereof, the general disclosure is not limited to the above-described embodiments. It will be understood by those of ordinary skill in the art that various changes and variations in form and details may be made therein without departing from the spirit and scope of the disclosure as defined by the following claims.

What is claimed is:
1. A storage device comprising:
 a nonvolatile memory including a plurality of memory blocks; and,
 a memory controller configured to determine a comparison between an idle current value of the nonvolatile memory and a reference current value and to adjust, based on the comparison, a start temperature at which the storage device begins operating speed control of the storage device,
 wherein the memory controller is further configured to increase the start temperature from a first value when the idle current value is greater than the reference current value.

2. The storage device of claim 1, wherein the memory controller decreases the start temperature from the first value when the idle current value is smaller than the reference current value.

3. The storage device of claim 1, wherein the memory controller receives a command that includes the idle current value from an external test device and stores the received idle current value in at least one memory block of the plurality of memory blocks.

4. The storage device of claim 3, wherein the at least one memory block of the plurality of memory blocks is within a security area in which bad area information of the nonvolatile memory and the idle current value of the nonvolatile memory are stored.

5. The storage device of claim 1, further comprising:
 a temperature sensor configured to detect temperature and to output information of the detected temperature to the memory controller.

6. The storage device of claim 5,
 wherein the storage device is configured to operate in a first mode in which the storage device operates at first speed that is lower than normal speed when the detected temperature is equal to or greater than a first start temperature and the detected temperature is included in a first temperature range that is lower than a second start temperature,
 wherein the storage device is configured to operate in a second mode in which the storage device operates at second speed that is lower than the first speed when the detected temperature is equal to or greater than the second start temperature and the detected temperature is included in a second temperature range that is lower than a third start temperature, and
 wherein the storage device is configured to operate in a third mode in which the storage device operates at third speed that is lower than the second speed when the detected temperature is included in a third temperature range that is greater than the third start temperature.

7. The storage device of claim 6, wherein the memory controller includes a first reference current value corresponding to the first temperature range, a second reference current value corresponding to the second temperature range, and a third reference, current value corresponding to the third temperature range.

8. The storage device of claim 7,
 wherein the memory controller increases the first start temperature from a first value when a first idle current value of the storage device corresponding to the first temperature range is greater than the first reference current value,
 wherein the memory controller increases the second start temperature from a second value when a second idle current value of the storage device corresponding to the second temperature range is greater than the second reference current value, and
 wherein the memory controller increases the third start temperature from a third value when a third idle current value of the storage device corresponding to the third temperature range is greater than the third reference current value.

9. The storage device of claim 7,
wherein the memory controller decreases the first start temperature from a first value when a first idle current value of the storage device corresponding to the first temperature range is less than the first reference current value,
wherein the memory controller decreases the second start temperature from a second value when a second idle current value of the storage device corresponding to the second temperature range is less, than the second reference current value, and
wherein the memory controller decreases the third start temperature from a third value when a third idle current value of the storage device corresponding to the third temperature range is less than the third reference current value.

10. The storage device of claim 1, wherein the idle current value is stored in at least one memory block of the plurality of memory blocks or in a read only memory.

11. A storage device comprising:
a nonvolatile memory including a plurality of memory blocks;
a temperature sensor configured to detect a detected temperature; and
a memory controller configured to determine a comparison between an idle current value of the storage device and a reference current value and to adjust, based on the comparison, a start temperature at which the storage device begins operating speed control of the storage device,
wherein the memory controller is configured to operate at an operating speed lower than an operating speed of a normal operation when the detected temperature obtained from the temperature sensor is equal to or greater than the start temperature,
wherein the memory controller is further configured to receive the idle current value via a command, and
wherein the command is a combination of one or more normal commands or a vendor unit command.

12. The storage device of claim 11,
wherein the nonvolatile memory comprises cell strings arranged on a substrate, and
wherein ones of the cell strings comprise at least one selection transistor and memory cells stacked on the substrate in a direction perpendicular to the substrate.

13. The storage device of claim 12, wherein ones of the at least one selection transistor and the memory cells are charge-trap-type transistors.

14. A storage device comprising:
a nonvolatile memory; and
a memory controller coupled to the nonvolatile memory,
wherein the memory controller is configured to:
determine an idle current value of the storage device corresponding to a current flowing to the storage device when the storage device performs no read, erase, and/or program operation;
determine a comparison between the idle current value of the storage device and a reference current value;
adjust a start temperature based on the comparison between the idle current value of the storage device and the reference current value;
determine a comparison between a present temperature of the storage device and the start temperature; and
regulate a speed of the storage device based on the comparison between the present temperature of the storage device and the start temperature.

15. The storage device of claim 14,
wherein the memory controller is configured to, adjust the start temperature by increasing the start temperature when the idle current value is greater than the reference current value, and
wherein the memory controller is configured to regulate the speed of the storage device by operating the storage device at a first speed when the present temperature of the storage device is less than the start temperature and operating the storage device at a second speed that is less than the first speed when the present temperature of the storage device is greater than the start temperature.

16. The storage device of claim 14,
wherein the memory controller is configured to adjust the start temperature by decreasing the start temperature when the idle current value is less than the reference current value, and
wherein the memory controller is configured to regulate the speed of the storage device by operating the storage device at a first speed when the present temperature of the storage device is less than the start temperature and operating the storage device at a second speed that is less than the first speed when the present temperature of the storage device is greater than the start temperature.

17. The storage device of claim 14,
wherein the start temperature comprises a first start temperature, a second start temperature that is greater than the first start temperature, and a third start temperature that is greater than the second start temperature,
wherein the reference current value comprises a first reference current value, a second reference current value, and a third reference current value,
wherein the memory controller is configured to adjust the start temperature by increasing the first start temperature when the idle current value is greater than the first reference current value, increasing the second start temperature when the idle current value is greater than the second reference current value, and increasing the third start temperature when the idle current value is greater than the third reference current value, and
wherein the memory controller is configured to regulate the speed of the storage device by operating the storage device at a first speed when the present temperature of the storage device is less than the first start temperature, operating the storage device at a second speed that is less than the first speed when the present temperature of the storage device is greater than the first start temperature and less than the second start temperature, operating the storage device at a third speed that is less than the second speed when the present temperature of the storage device is greater than the second start temperature and less than the third, start temperature, and operating the storage device at a fourth speed that is less than the third speed when the present temperature of the storage device is greater than the third start temperature.

18. The storage device of claim 14,
wherein the start temperature comprises a first start temperature, a second start temperature, and a third start temperature,
wherein the reference current value comprises a first reference current value, a second reference current value, and a third reference current value,
wherein the memory controller is configured to adjust the start temperature by decreasing the first start temperature when the idle current value is less than the first reference current value, decreasing the second start temperature when the idle current value is less than the second reference current value, and decreasing the third start temperature when the idle current value is less than the third reference current value, and wherein the memory controller is configured to regulate the speed of the storage device by operating the storage device at a first speed when the present temperature of the storage device is less than the first start temperature, operating the storage device at a second speed that is less than the first speed when the present temperature of the storage device is greater than the first start temperature and less than the second start temperature, operating the storage device at a third speed that is less than, the second speed when the present temperature of the storage device is greater than the second start temperature and less than the third start temperature, and operating the storage device at a fourth speed that is less than the third speed when the present temperature of the storage device is greater than the third start temperature.

19. The storage device of claim 14, wherein, the memory controller is further configured to receive a command that includes the idle current value from an external test device and store the received idle current value in at least one memory block of a plurality of memory blocks of the nonvolatile memory.

20. The storage device of claim 19, wherein the at least one memory block of the plurality of memory blocks is within a security area in which bad area information of the nonvolatile memory is stored.

* * * * *